United States Patent
Rajon et al.

(10) Patent No.: US 9,623,733 B2
(45) Date of Patent: Apr. 18, 2017

(54) TAILGATE INTENDED TO BE PIVOTABLY MOUNTED ONTO MOTOR VEHICLE BODYWORK, HAVING IMPROVED ABUTMENT

(71) Applicants: Alexis Rajon, Lyons (FR); Philippe Coudron, Caluire & Cuire (FR); Pascal Depardon, Meximieux (FR)

(72) Inventors: Alexis Rajon, Lyons (FR); Philippe Coudron, Caluire & Cuire (FR); Pascal Depardon, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/891,567

(22) PCT Filed: May 15, 2014

(86) PCT No.: PCT/FR2014/051138
§ 371 (c)(1),
(2) Date: Nov. 16, 2015

(87) PCT Pub. No.: WO2014/184500
PCT Pub. Date: Nov. 20, 2014

(65) Prior Publication Data
US 2016/0068050 A1    Mar. 10, 2016

(30) Foreign Application Priority Data
May 17, 2013  (FR) ...................................... 13 54498

(51) Int. Cl.
*B60J 5/10* (2006.01)
*E05F 5/02* (2006.01)

(52) U.S. Cl.
CPC ............... *B60J 5/107* (2013.01); *E05F 5/022* (2013.01); *E05Y 2900/50* (2013.01); *E05Y 2900/546* (2013.01)

(58) Field of Classification Search
CPC ................ B60J 5/107; E05Y 2900/532; E05Y 2900/546
(Continued)

(56) References Cited

U.S. PATENT DOCUMENTS 4,880,267 A * 11/1989 Ohya ....................... B60J 5/107
296/146.8
6,889,472 B2 * 5/2005 Nozaki ..................... B60J 10/22
49/475.1
(Continued)

FOREIGN PATENT DOCUMENTS

EP    2502770 A1    9/2012
FR    2927351 A1    8/2009

*Primary Examiner* — Dennis H Pedder
(74) *Attorney, Agent, or Firm* — Jacox, Meckstroth & Jenkins

(57) ABSTRACT

A tailgate that is intended to be mounted onto motor vehicle body such as to be pivotable between an open position and a closed position, and is intended to be connected to the body by means that generate an axial thrust for assisting in the opening of the tailgate. The tailgate includes an abutment, referred to as an anti-deformation abutment, for engaging, when the tailgate is in the closed position, with a complementary bearing of the body such that the complementary bearing exerts a reactive force against the anti-deformation abutment, having a direction parallel to a direction of thrust of the assistance means, or angled at most 45° relative to the thrust direction, and having at least one component in the direction opposite the direction of thrust of the assistance means.

9 Claims, 2 Drawing Sheets

Figure 1:
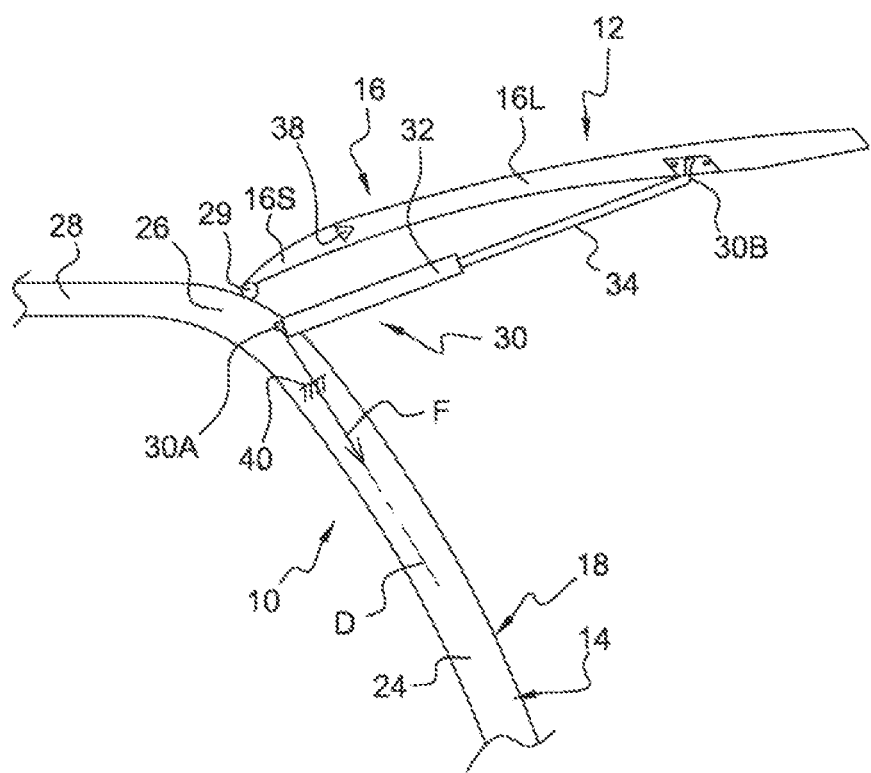

(58) Field of Classification Search
USPC ........ 16/85, 86 R, 86 A; 296/106, 56, 146.8, 296/207
See application file for complete search history.

(56) References Cited

U.S. PATENT DOCUMENTS

| | | | |
|---|---|---|---|
| 7,959,204 B2* | 6/2011 | Yoshida | ................... E05F 15/63 296/56 |
| 8,136,861 B2 | 3/2012 | Rajon | |
| 8,746,777 B2 | 6/2014 | Iwano et al. | |
| 2011/0042992 A1 | 2/2011 | Rajon | |
| 2012/0248814 A1* | 10/2012 | Tsukiyama | ........... B62D 35/007 296/146.8 |
| 2012/0272580 A1 | 11/2012 | Iwano et al. | |

* cited by examiner

TAILGATE INTENDED TO BE PIVOTABLY MOUNTED ONTO MOTOR VEHICLE BODYWORK, HAVING IMPROVED ABUTMENT

CROSS-REFERENCE TO RELATED APPLICATIONS

This application is the U.S. National Phase application of PCT Application No. PCT/FR2014/051138 filed May 15, 2014, which claims priority to the French application 1354498 filed on May 17, 2013, which applications are incorporated herein by reference and made a part hereof.

BACKGROUND OF THE INVENTION

1. Field of the Invention

This invention relates to the technical field of motor vehicle openings and in particular the tailgates of such motor vehicles.

2. Description of the Related Art

A motor vehicle tailgate is generally firstly pivotably mounted on a body of this vehicle, between an open position and a closed position, and secondly connected to this body by means that generate an axial thrust for assisting with the opening of the tailgate.

In closed position, the tailgate is generally intended to block a fixed rear opening of the body.

The means for hinging the tailgate on the body generally comprise a pair of hinges connecting firstly an upper edge of the opening and, secondly, an upper edge of the tailgate, and forming a horizontal hinge axis.

The means for assisting with the opening of the tailgate, which also help to cushion the tailgate closing movement, generally comprise at least one gas cylinder, generally two gas cylinders, one on the left and one on the right. Each gas cylinder is provided with a first end for connection with the body, in particular with a side edge of the rear opening, and a second end for connection with the tailgate, in particular with a side edge of the tailgate, so as to exert an axial thrust between these two connection ends.

The tailgate is held locked in closed position by additional means forming a lock arranged on this tailgate and the body.

A seal carried by the body or the tailgate is generally inserted and compressed between the tailgate in closed position and the body.

A motor vehicle tailgate of the "all plastic" type already known in the prior art comprises a plastic box (arranged on the inside of the vehicle when the tailgate is in closed position) and a plastic panel (arranged on the outside of the vehicle when the tailgate is in closed position). If necessary, a glass forming a rear window is carried by the panel.

The box and the panel can be made more particularly of thermoplastic materials. They are assembled together in particular by bonding.

In the case of a tailgate comprising components made of thermoplastic materials, we observe, under the effect of various mechanical and thermal stresses, the appearance of deformations of the tailgate panel (when the tailgate is in closed position).

More particularly, in some configurations connecting the ends of the assistance gas cylinders with the tailgate and the body, we observe the appearance of alignment faults of the tailgate with the complementary contour of the rear opening of the body, these alignment faults being located, considering the tailgate in closed position, in areas of the tailgate close to the side ends (left and right) of its upper edge. The appearance of alignment faults in the side ends (left and right) of the upper edge of the tailgate leads, firstly, to swelling towards the top of the part of the upper edge of the tailgate extending between the hinges, and secondly, the appearance of a clearance fault between the lower edge of the tailgate and the complementary contour of the rear opening of the body.

The mechanical stresses tending to produce these faults are generated in particular by the tailgate hinge and anchor points on the body, the seal compressed between the body and the tailgate (when the latter is in closed position) and the gas cylinders assisting with the opening of the tailgate which continue to exert their axial thrust when this tailgate is in closed position. We observe that the axial thrust of the gas cylinders, when the tailgate is in closed position, are largely responsible for the tailgate panel alignment faults.

SUMMARY OF THE INVENTION

The main objective of the invention is to limit or even eliminate the appearance of deformations of a motor vehicle tailgate, in particular, in some configurations, tailgate alignment faults, this tailgate comprising a box made at least partially of plastic, more particularly thermoplastic material, or a material whose expansion characteristic is quite different from that of a steel body, for example aluminum.

To this end, the invention relates to a tailgate that is intended to be mounted onto a motor vehicle body such as to be pivotable between an open position and a closed position, and is intended to be connected to this body by means that generate an axial thrust for assisting with the opening of the tailgate, wherein it comprises an abutment, referred to as an anti-deformation abutment positioned on the tailgate for engaging, when the tailgate is in closed position, with a complementary bearing of the body such that this complementary bearing exerts a reaction force against the anti-deformation abutment;

having a direction parallel to a direction of thrust of the assistance means, or angled at most 45° relative to this direction of thrust, and having at least one component in the direction opposite to the direction of thrust of the assistance means.

It has been observed in fact that positioning the anti-deformation abutment on the tailgate as specified above prevents, or at least limits, the appearance of deformations of the tailgate, in particular, in the configurations concerned, of alignment faults of the tailgate with the complementary contour of the body by localized sagging of this tailgate.

In particular, the appearance of tailgate deformations, in particular tailgate alignment faults, is efficiently limited by placing the anti-deformation abutment near an area of the tailgate likely to suffer alignment faults with the complementary contour of the rear opening of the body by sagging of this area under the effect of various mechanical and thermal stresses.

According to other optional characteristics of this tailgate:

the assistance means comprise at least one gas cylinder;

when the tailgate is in closed position, the anti-deformation abutment is intended to be positioned closer to an end connecting the gas cylinder with the body than an end connecting this gas cylinder with the tailgate;

the anti-deformation abutment comprises a mass of elastically deformable material, in particular elastomer, intended to come into contact with the complementary bearing of the body;

the tailgate comprises a box made at least partially of thermoplastic material;

when the tailgate is in closed position, the anti-deformation abutment is positioned in the upper half of the tailgate;

when the tailgate is in closed position, the anti-deformation abutment is positioned near a side end of an upper edge of the tailgate.

These and other objects and advantages of the invention will be apparent from the following description, the accompanying drawings and the appended claims.

BRIEF DESCRIPTION OF THE ACCOMPANYING DRAWINGS

Figure 2:
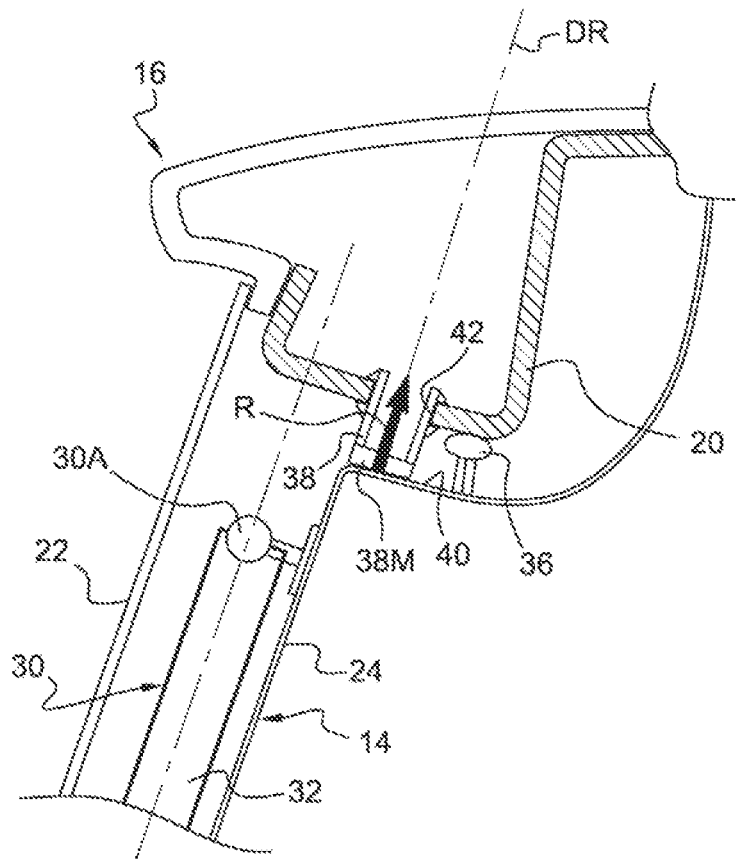
Figure 2:
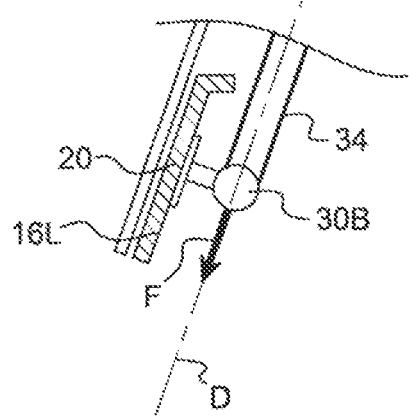

The invention will be better understood on reading the following description, given solely by way of example and with reference to the accompanying drawings in which:

FIG. 1 is a schematic side view of the rear of a motor vehicle, showing a tailgate according to the invention in open position; and FIG. 2 is a sectional view through an axial plane of the anti-deformation abutment carried by the tailgate shown on FIG. 1, this tailgate being in closed position.

DETAILED DESCRIPTION OF THE PREFERRED EMBODIMENTS

FIG. 1 shows the rear of a motor vehicle 10 comprising an assembly 12 with a body 14 and a tailgate 16 mounted on the body 14 such as to be pivotable between an open position, as shown on FIG. 1, and a closed position, as shown on FIG. 2.

In closed position, the tailgate 16 blocks a fixed rear opening 18 of the body 14.

As shown in FIG. 2, in the example described, the tailgate 16 is of the "all plastic" type and comprises a plastic box 20 (arranged on the inside of the vehicle 10 when the tailgate 16 is in closed position) and a plastic panel 22 (arranged on the outside of the vehicle 10 when the tailgate 16 is in closed position). If necessary, a glass forming a rear window is carried by the panel 22.

More particularly, the box 20 and panel 22 are made of thermoplastic materials and are assembled together by known means, for example by bonding.

Alternatively, the tailgate 16 may comprise a box 20 made only partly of thermoplastic material.

Note that on the figures, the pairs of elements arranged symmetrically on the body 14 or the tailgate 16, especially on the left and right sides of the body 14 or of the tailgate 16, are represented by only one of these symmetrical elements.

As shown in FIG. 1, the rear opening 18 of the body 14 is defined in particular by a pair of rear uprights 24 of the body 14, forming side edges of the opening 18 and a rear cross member 26 of the body 14, also defining a roof 28 of this body 14 and forming an upper edge of the opening 18.

The tailgate 16 is hinged on the body 14 using means comprising, in the example described, a pair of hinges 29 connecting, firstly, the upper edge of the opening 18 formed by the rear cross member 26, and, secondly, an upper edge 16S of the tailgate 16. These hinges 29 form a horizontal hinge axis.

The assembly 12 also comprises means connecting the body 14 and the tailgate 16, generating an axial thrust assisting with the opening of the tailgate 16.

The means for assisting with the opening of the tailgate 16, which also help to cushion the closing movement of this tailgate 16, comprise a pair of traditional gas cylinders 30, one on the left and one on the right.

Each gas cylinder 30 is provided with a first end 30A for connection with the body 14, more particularly with a side edge of the rear opening 18, formed by the rear upright 24, and a second end 30B for connection with the tailgate 16, more particularly with a side edge 16L of the tailgate 16, so as to exert an axial thrust between these two connection ends 30A, 30B.

Each gas cylinder 30 is provided with a body 32 in which a rod 34 is mounted slidably between minimum and maximum length positions of the gas cylinder 30. The rod 34 is pushed towards the position of maximum length of the gas cylinder 30 under the effect of the axial thrust, in order to assist with the opening movement of the tailgate 16.

The first end 30A of the gas cylinder 30 is formed by a free end of the body 32 which forms a hinge point of the gas cylinder 30 fixed relative to the body 14. The second end 30B of the gas cylinder 30 is formed by a free end of the rod 34 which forms a hinge point of the gas cylinder 30 movable relative to the body 14.

Alternatively, the means for assisting with the opening of the tailgate 16 could have only one gas cylinder 30.

As shown in FIG. 2, a seal 36 carried by the body 14 is inserted and compressed between the tailgate 16 in closed position and the body 14.

Note that, in FIGS. 1 and 2, a line of short and long dashes and an arrow F show respectively the direction D of thrust of a gas cylinder 30 when the tailgate 16 is in closed position, and the direction D of this thrust, when the tailgate 16 is in closed position.

As shown in FIGS. 1 and 2, the tailgate 16 comprises a pair of anti-deformation abutments 38, each being intended to engage, when the tailgate 16 is in closed position, with an abutment or corresponding complementary bearing 40 of the body 14.

In the example shown, the anti-deformation abutment 38 comprises a mass 38M of elastically deformable material, in particular elastomer as in the example described, intended to come into contact with the complementary bearing 40 of the body 14. This elastomer mass 38M is hooked in a known manner, directly or indirectly, to the tailgate box 20, for example by clipping in a hole 42 formed in the box 20 or any other hooking means. The part of the box 20 in which the hole 42 or means for hooking the mass 38M is made or arranged may be reinforced if necessary.

The bearing 40, arranged on the body 14, is preferably made of metal sheet, like the part of the body 14 defining the opening 18. This metal sheet may be reinforced at the bearing 40 if necessary.

As shown more particularly on FIG. 2, when the tailgate 16 is in closed position, the positioning of the anti-deformation abutment 38 on the tailgate 16 allows this tailgate 16 to engage with a complementary bearing 40 of the body 14, such that this complementary bearing 40 exerts a reaction force against the anti-deformation abutment 38.

This reaction force has:
  a direction DR parallel to the direction of thrust D of each gas cylinder 30 or angled at most 45° relative to this direction of thrust D, and
  at least one component R of direction opposite to the direction of thrust F of each gas cylinder 30.

Note that, in FIG. 2, a line of short and long dashes shows the direction DR and an arrow R shows the component of the reaction force of direction opposite to the direction of thrust F of each gas cylinder 30, when the tailgate 16 is in closed position.

Preferably, the anti-deformation abutment 38 should be sized to be subjected to a reaction force from the complementary bearing 40 of modulus between 200 and 500 N.

In the example shown, considering the tailgate 16 in closed position, the first end 30A of the gas cylinder 30 is connected to an upper part of the side edge of the rear opening 18, and the second end 30B of the gas cylinder 30 is connected to a lower part of the side edge 16L of the tailgate 16.

In the configuration connecting the ends of the gas cylinders 30 with the tailgate 16 and the body 14 of the example described, the deformations that the abutments 38 limit, or even eliminate, are alignment faults of the tailgate 16 located, considering the tailgate 16 in closed position, in areas of the tailgate 16 near the side ends (left and right) of its upper edge 16S.

Thus, preferably, the appearance of tailgate alignment faults is efficiently limited by placing the two anti-deformation abutments 38 on the tailgate 16 as specified above and near the two side ends (left and right) of the upper edge 16S of the tailgate 16. It has been observed, in fact, that these left and right ends of the upper edge 16S of the tailgate 16 are more likely to suffer alignment faults with the complementary contour of the body, i.e. the contour of the body defining the opening 18, by sagging of these ends under the effect of various mechanical and thermal stresses.

Thus, in the example shown, when the tailgate 16 is in closed position, each anti-deformation abutment 38 is positioned in the upper half of this tailgate 16.

Note also that, in the example shown, when the tailgate 16 is in closed position, each anti-deformation abutment 38 is positioned closer to the end 30A connecting the gas cylinder 30 with the body 14 than the end 30B connecting this gas cylinder 30 with the tailgate 16.

The invention is not limited to the embodiment shown on the figures and other embodiments will be clearly apparent to those skilled in the art.

In particular, each gas cylinder 30 can be connected to the body 14 and to the tailgate 16 otherwise than as shown. In particular, considering the tailgate 16 in closed position, the first end 30A of the gas cylinder 30 could be connected to a lower part of the side edge of the rear opening 18, and the second end 30B of the gas cylinder 30 could be connected to an upper part of the side edge 16L of the tailgate 16.

Each anti-deformation abutment 38 could also, when the tailgate 16 is in closed position, be positioned in the lower half of this tailgate 16.

Furthermore, if the assistance means comprise a single gas cylinder 30, a single anti-deformation abutment 38 associated with this single gas cylinder abutment could be provided.

In addition, the bearing 40 of the body 14 could comprise an elastomer mass intended to come into contact with the anti-deformation abutment 38 of the tailgate 16, this abutment 38 being formed by a part, possibly reinforced, of the tailgate 16, for example a part of the box 20 of the tailgate 16.

Lastly, the tailgate 16 may comprise a box made at least partially of a material whose expansion characteristic is quite different from that of a steel body, for example aluminum, the abutments 38 limiting or even eliminating, the deformations of the tailgate 16.

While the process and method herein described constitute preferred embodiments of this invention, it is to be understood that the invention is not limited to this precise process and method, and that changes may be made therein without departing from the scope of the invention which is defined in the appended claims.

What is claimed is:

1. A tailgate mounted onto a motor vehicle body such as to be pivotable between an open position and a closed position, and connected to said motor vehicle body by assistance means that generate an axial thrust for assisting with the opening of said tailgate, wherein said tailgate comprises a sealing element and an anti-deformation abutment, said anti-deformation abutment positioned on said tailgate for engaging, when said tailgate is in said closed position, with a complementary bearing of said motor vehicle body such that said complementary bearing exerts a local reaction force against said anti-deformation abutment;
 having a direction (DR) substantially parallel and opposite to a direction of thrust (D) of said assistance means, or angled at most 45° relative to said direction of thrust (D), and
 having at least one component (R) in a direction opposite to a direction of thrust (F) of said assistance means.

2. The tailgate according to claim 1, wherein said anti-deformation abutment comprises a mass of elastically deformable material intended to come into contact with said complementary bearing of said motor vehicle body.

3. The tailgate according to claim 1, comprising a box made at least partially of thermoplastic material.

4. The tailgate according to claim 1, wherein, when said tailgate is in said closed position, said anti-deformation abutment is positioned in an upper half of said tailgate.

5. The tailgate according to claim 1, wherein, when said tailgate is in said closed position, said anti-deformation abutment is positioned near a side end of an upper edge of said tailgate.

6. A tailgate mounted onto a motor vehicle body such as to be pivotable between an open position and a closed position, and connected to said motor vehicle body by assistance means that generate an axial thrust for assisting with the opening of said tailgate, wherein said tailgate comprises a sealing element and an anti-deformation abutment, said anti-deformation abutment positioned on said tailgate for engaging, when said tailgate is in said closed position, with a complementary bearing of said motor vehicle body such that said complementary bearing exerts a local reaction force against said anti-deformation abutment;
 having a direction (DR) substantially parallel and opposite to a direction of thrust (D) of said assistance means, or angled at most 45° relative to said direction of thrust (D), and
 having at least one component (R) in a direction opposite to a direction of thrust (F) of said assistance means;
 wherein said assistance means comprise at least one gas cylinder.

7. The assembly according to claim 6, wherein, when said tailgate is in said closed position, said anti-deformation abutment is positioned closer to an end connecting said at least one gas cylinder with said motor vehicle body than an end connecting said at least one gas cylinder with said tailgate.

8. The tailgate according to claim 1, wherein said anti-deformation abutment comprises a mass of elastomer, intended to come into contact with said complementary bearing of said motor vehicle body.

9. The tailgate according to claim 2, wherein said elastically deformable material comprises an elastomer.

* * * * *

UNITED STATES PATENT AND TRADEMARK OFFICE
CERTIFICATE OF CORRECTION

| | | |
|---|---|---|
| PATENT NO. | : 9,623,733 B2 | Page 1 of 1 |
| APPLICATION NO. | : 14/891567 | |
| DATED | : April 18, 2017 | |
| INVENTOR(S) | : Alexis Rajon et al. | |

It is certified that error appears in the above-identified patent and that said Letters Patent is hereby corrected as shown below:

On the Title Page

Item (71), delete "Lyons" and insert --Lyon-- therefor.
Item (72), delete "Lyons" and insert --Lyon-- therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*